Aug. 17, 1954  S. E. TOBERT  2,686,439
METHOD OF MAKING CUTTING TOOLS
Filed April 27, 1948  2 Sheets-Sheet 1

INVENTOR
Sven Eskil Tobert,

BY Karl W. Flocks
ATTORNEY

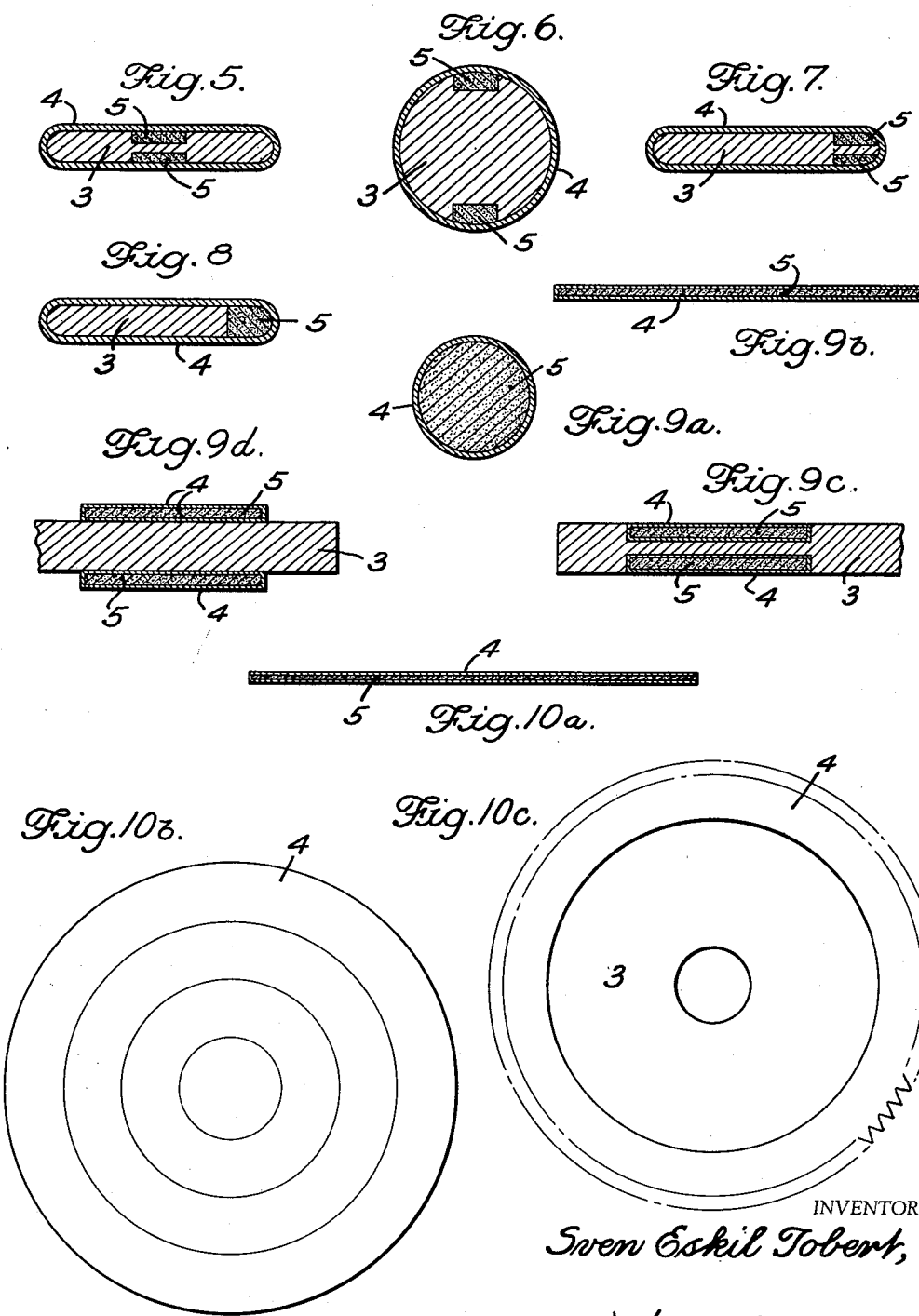

Patented Aug. 17, 1954

2,686,439

UNITED STATES PATENT OFFICE 2,686,439

METHOD OF MAKING CUTTING TOOLS

Sven Eskil Tobert, Appelviken, Sweden, assignor to Thoger G. Jungersen, Summit, N. J.

Application April 27, 1948, Serial No. 23,531

16 Claims. (Cl. 76—112)

The present invention relates to cutting tools and has for its general object to provide new and useful improvements in the manufacture of such tools, especially saw blades, having cutting edges or teeth of so-called hard metal.

A more specific object of my invention is to make the manufacture of cutting tools, especially saw blades, having hard metal cutting edges independently of the non-plastical characteristics of the hard metal used.

Another object of the invention is to avoid brazing operations in the manufacture of cutting tools, such as saw blades, having hard metal cutting edges.

A further object of the invention is to make possible in the manufacture of cutting tools, such as saw blades, having hard metal cutting edges, to reduce the thickness of the hard metal layer to the minimum value necessary for the cutting function of said layer.

Hard metal produced by sintering different pulverulent metals and alloys is not capable of being molded, either in cold or in hot condition. The practice is to either produce plates or the like which are subsequently broken into pieces and ground to their intended shape, or the powder is sintered in a predetermined shape after which the hard metal body thus shaped is ground. This absence of moldability has made it impossible to employ hard metal for all kinds of cutting tools. According to well-known practice a small piece of hard metal is brazed on a lathe tool, for example.

Hard metal is inherently rather costly, and the working cost for attaching the hard metal edges to tools is also rather high, even though, owing to its increased life, a relatively high cost of the tool obtained may be considered reasonable. One field in which hard metal has not yet been advantageously employed in the manufacture of saw blades. Whilst, as far as I know, it was not known prior to this invention to make a hard metal saw blade, as is shown in Figs. 1a and 1b of the accompanying drawings, by brazing hard metal pieces 1 on the body and teeth of a conventional saw blade 2, such a procedure would be rather costly and as a result would limit its application to particularly qualified objects.

In order to attain the objects stated my invention consists in a method of manufacturing cutting tools, especially saw blades, having cutting edges of hard metal, which comprises filling one or more grooves or recesses in, or spaces adjacent a core plate or body for the tool with hard metal powder, covering said grooves, recesses or spaces completely, and said core plate completely or partly, with a foil or envelope of a metal or alloy capable of being plated both on the finished hard metal and on said core plate, the plating temperature of said foil or envelope being lower than the sintering temperature of said hard metal powder, plating said foil or envelope on said core plate at a temperature below said sintering temperature of the hard metal powder, subjecting the assembly thus obtained, if necessary, to a plastical shaping operation to give it a thickness suitable for the completed tool, heating the assembly thus shaped to the sintering temperature of said hard metal powder and maintaining said assembly at said temperature until said powder has become sintered into hard metal, and stamping or cutting out one or more cutting tools from the blank thus produced.

According to a modified embodiment of the invention a method of manufacturing cutting tools, especially saw blades, having cutting edges of hard metal comprises filling hard metal powder into a hollow body, preferably a length of tube, consisting of a metal or alloy capable of being plated both on the finished hard metal and on said core plate, subjecting said body or tube to a plastical shaping operation to give it a thickness suitable for the completed tool, plating the assembly thus shaped on a core plate for said tool, such as band steel or sheet steel or a roller blank therefor, heating the assembly obtained, after rolling the same, if necessary, to said sintering temperature of the hard metal powder and maintaining the assembly at said temperature until said powder has become sintered into hard metal, and stamping or cutting out one or more cutting tools from the blank thus produced.

In the case of flat blanks, said plastical shaping operation consists in subjecting the assembly, prior to the sintering, to one or more rolling operations. For this purpose it is possible to employ either cold-rolling or hot-rolling. When hot-rolling is resorted to the same is carried out at a lower temperature than the sintering temperature of the hard metal powder. When the material available has a thickness which does not necessitate any plastical shaping operation, then the sintering of the hard metal powder will be carried out as the step immediately following the plating of the metal or alloy on the core plate. When the core plate is of such a thinness that one single rolling operation will suffice in order to obtain the finished dimension, then, according to a further modification of the invention, the rolling operation may be carried out at the very sintering temperature of the hard metal powder, in which case the sintering is performed immediately following said rolling operation.

I will now proceed to describe, by way of example, a number of embodiments of my invention which are illustrated in the accompanying drawings in which:

Figs. 5, 6, 7 and 8 are cross-sectional views of a couple of alternative embodiments of the invention.

Figs. 9a, 9b, 9c and 9d are cross-sectional views of a further alternative embodiment of the invention.

Figs. 10a, 10b and 10c are a cross-sectional view and two side views, respectively, showing different steps in the manufacture of circular saw blades according to the present invention.

Figure 1A:
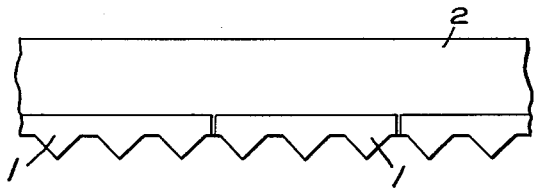
Figs. 1a and 1b illustrate the manner in which the brazing of hard metal pieces upon a conventional saw blade might be carried out, Fig. 1a being a side view and Fig. 1b a cross-sectional view of a portion of the blade.
Figure 1B:
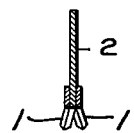
Figure 2A:
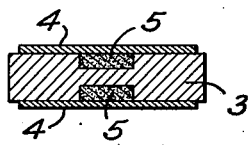
Figs. 2a, 2b and 2c are cross-sectional views, respectively, of three different embodiments of the invention as applied to a non-rolled blank assembly for making saw blades.
Figure 3A:
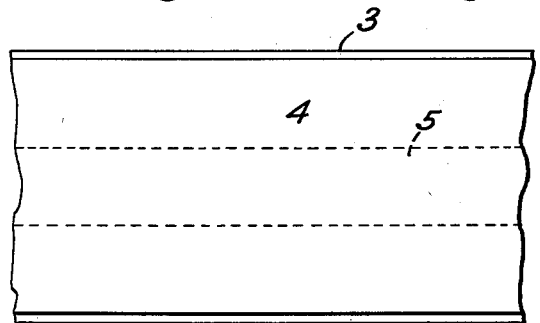
Figs. 3a and 3b are a side view and a cross-sectional view, respectively, of a rolled blank assembly for a saw blade.
Figure 3B:
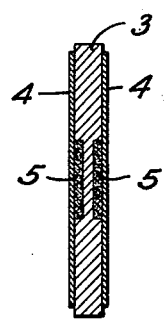
Figure 4A:
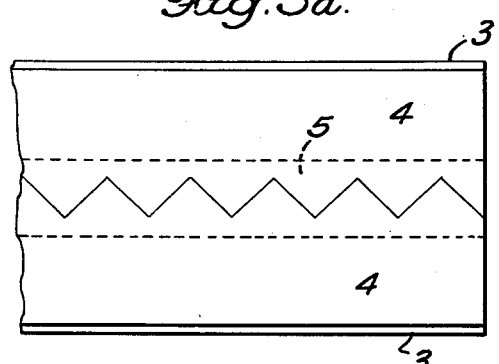
Figs. 4a and 4b are a side view and an exploded cross-sectional view, respectively, of a rolled saw blade blank stamped or cut into two saw blades.
Figure 4B:
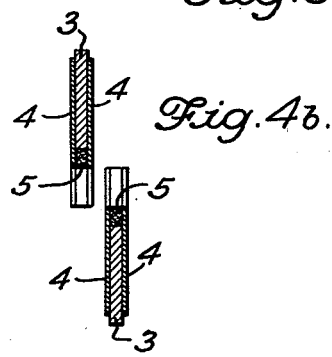

Referring first to Fig. 2a of the accompanying drawings, two oppositely disposed and aligned grooves in a metal blank or core plate 3 of steel, iron or the like are filled with hard metal powder 5 after which the core 3 and powder 5 are covered with plates or foils 4 of a metal or alloy which is capable of being plated on the core 3 under the influence of pressure and heat and at a temperature below the sintering temperature of the hard metal powder. Thereafter said plating is carried out according to any suitable previously known method, such as the so-called Miller-method which is particularly suitable for the purpose. The method of plating two sheets of metal under the influence of heat and pressure is also disclosed in United States Patent No. 303,025 to McCleane et al. dated August 5, 1884. During the plating operation the hard metal powder will retain its pulverulent condition, i. e. the particles are not sintered but are free to move relative to each other. Now, if the blank is rolled into a strip or band having a thickness suitable for saw blades, for instance, either by being cold-rolled or by being hot-rolled at a lower hot-rolling temperature than the sintering temperature of the hard metal powder used, then the hard metal powder will take part in this plastical shaping operation. As a result of the rolling operation a strip is obtained, such as that of Figs. 3a and 3b, for instance, and having a hard metal powder layer which has been thinned by the rolling operation. This strip is then, in any suitable manner, heated up to the sintering temperature of the hard metal powder and is maintained at this temperature until the powder will have become sintered into hard metal. After the sintering operation two saw blades, for instance, are cut or stamped out of the strip, as shown in Figs. 4a and 4b. The plating metal 4 may be removed by etching or grinding, either before or after the saw blades have been cut out of the blank. Alternatively the plating metal is permitted to remain on the finished saw blade, this being often of considerable advantage in that, upon setting the saw teeth, said plating will protect the saw blade against breakage.

Figure 2B:
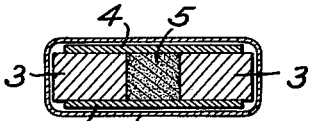
Figure 2C:
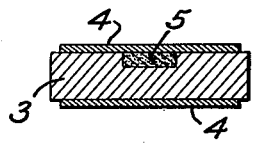

Whilst the main principle of the invention will have been clearly laid down by the example just described, many variations thereof are, of course, possible without departing from the scope of the invention. Thus, according to Fig. 2b one single layer of hard metal powder 5 is employed separating two core portions 3. In this embodiment, in order to ensure that, during the plastical shaping operation following the plating operation, the plating metal might not be subjected to excessive strain, the entire assembly may be wrapped up in an envelope 7 consistng of a material having greater strength, which material need not be platable at a temperature below the sintering temperature of the hard metal powder. Fig. 2c illustrates an embodiment having a hard metal layer on one side only of the core plate.

The embodiments of Figs. 5, 6, 7 and 8 are based on the principle that the basic material or core 3 for the saw blade or the like is inserted in a length of tube 4 consisting of a metal or alloy of the above-mentioned type after which grooves or recesses in, or spaces adjacent the core are filled with hard metal powder, whereafter the plastical shaping operation, i. e. the rolling operation, is carried out in any of the manners described in the foregoing. After rolling the material into thin strips or bands the hard metal powder is sintered in a similar manner as before, and saw blades can then be cut out of the finished blank. Fig. 5 illustrates an embodiment employing a flattened plating tube 4 and a core plate 3 having two longitudinally extending oppositely aligned grooves for the hard metal powder 5. Fig. 6 illustrates an embodiment employing a circular plating tube 4 and a cylindrical core 3 having two diametrically opposed grooves which are filled with hard metal powder 5 after the core has been inserted in the tube 4. Fig. 7 illustrates an embodiment employing a plating tube 4 of flattened shape, and having hard metal powder 5 in two oppositely arranged recesses in the core adjacent one longitudinal edge thereof. Fig. 8 illustrates an embodiment in which the hard metal powder is placed in a space within the plating tube 4 adjacent one longitudinal edge of the core 3. According to Figs. 9a to 9d a tube 4 (Fig. 9a) consisting of a metal or alloy of the type referred to is filled with hard metal powder, then the ends of said tube are closed and the tube rolled into a thin strip or band (Fig. 9b). Subsequently this strip can be plated either on a blank for rolling band steel (Figs. 9c and 9d) or, if the strip of Fig. 9 is made sufficiently thin, directly on a rolled band steel. In this case the rolled strip may be placed either in grooves or recesses in the core (Fig. 9c) or it may be plated onto the core, as shown in Fig. 9d. After this plating operation the sintering will be carried out in the manner described in the foregoing.

It is believed that the method just described will not be of the same great importance for the manufacture of straight saw blades as for the manufacture of circular saw blades. In this latter case a tube as shown in Fig. 9a (this tube can, of course, be of an initially flattened shape, as well) can be rolled into discs (Figs. 10a and 10b) of such diameter and thinness, and containing non-sintered hard metal powder, that after the sintering has been carried out concentric rings (Fig. 10b) can be cut or stamped out thereof and then be plated onto a saw blade blank under the influence of pressure and heat, after which the saw teeth can be cut out in any suitable manner (Fig. 10c). As shown in Fig. 10b, the cut out rings are of different size and thus they are suitable for producing circular saw blades of different diameters.

According to a further modified embodiment of the invention which is applicable when the core plate is so thin that one single rolling operation is sufficient in order to obtain the final dimension, said rolling operation is carried out at the very sintering temperature of the hard metal powder, and the sintering is completed immediately following the rolling operation. This is enabled due to the fact that in this case the rolling operation will proceed so rapidly that the sintering will not have time enough to be completed, and as a result the powder particles will retain a certain degree of freedom of relative movement and thus can conform to the comparatively moderate reduction of thickness involved when one single rolling operation is performed.

As the plating metal a metal or alloy of such a nature is preferably employed that, during the sintering of the hard metal powder and during a hardening of the core metal which may be undertaken, it will protect the material against decarburization and/or oxidation.

While I have described what may be considered as preferable embodiments of my invention, it will be understood that I do not limit myself to the precise conditions or arrangements of details herein set forth, as they may be varied by those skilled in the art in accordance with the particular use for which they are intended, and the conditions under which they are to be utilized.

What I claim and desire to secure by Letters Patent is:

1. A method of manufacturing saw blades having cutting edges of hard metal, from a core plate having at least one recess therein extending the length of the plate comprising filling the recess in the core plate with hard metal powder, covering said recess completely and at least part of said core plate with a sheet of a metal capable of being plated both on the hard metal powder and on said core, plating said sheet on said hard metal powder and said core plate at a temperature below the sintering temperature of the hard metal powder, subjecting the assembly thus obtained to a plastical shaping operation to impart thereto a thickness suitable for the completed saw blade, heating the assembly thus shaped to the sintering temperature of said hard metal powder and maintaining said assembly at said temperature until said powder has become sintered into hard metal, and forming at least one saw blade from the blank thus produced.

2. A method according to claim 1 in which said plastical shaping operation comprises cold-rolling.

3. A method of manufacturing saw blades, having cutting edges of hard metal attached to a core plate comprising filling hard metal powder into a hollow body, said body being made from a metal capable of being plated both on the hard metal powder and on the core plate for said saw blade by application of heat and pressure, subjecting said body filled with said powder to a plastical shaping operation to impart to it a thickness suitable for the completed saw blade, placing the body thus shaped on the core plate for the saw blade, applying heat and pressure to plate the body onto both the hard powder and the core plate, heating the assembly obtained to the sintering temperature for said hard metal powder and maintaining the assembly at said temperature until said powder has become sintered into hard metal, and forming at least one saw blade from the blank thus produced.

4. A method according to claim 3 in which said plastical shaping operation comprises cold-rolling.

5. A method according to claim 3 in which said plastical shaping operation comprises hot rolling at a lower temperature than the sintering temperature of said hard metal powder.

6. A method of manufacturing saw blades, having cutting edges of hard metal attached to a core plate, comprising forming at least one or more recesses in said core plate extending the length of the plate, filling said recesses with hard metal powder, covering each of said recesses completely and said core plate at least partly, with a sheet of a metal capable of being plated both on the hard metal powder and on said core, plating said sheets on said hard metal powder and said core plate at a temperature below the sintering temperature of said hard metal powder, heating the assembly thus obtained to the sintering temperature of said hard metal powder and maintaining said assembly at said temperature until said powder has become sintered into hard metal, and forming at least one saw blade from the blank thus produced.

7. A method of manufacturing saw blades having cutting edges of hard metal attached to a core plate, comprising forming at least one recess in said core plate extending the length of the plate, filling said recess in said core plate with hard metal powder, covering said recess completely and said core plate at least partly, with a sheet of a metal capable of being plated both on the hard metal powder and on said core, plating said sheet on said hard metal powder and said core at a temperature below the sintering temperature of said hard metal powder, subjecting the assembly thus obtained to a hot-rolling operation at a temperature which is lower than the sintering temperature of said hard metal powder but as close to said temperature as is practicable without making the rolling operation impossible, completing the sintering process commenced during said hot-rolling operation by heating the assembly to said sintering temperature, and forming at least one saw blade from the blank thus obtained.

8. A method of manufacturing saw blades having cutting edges of hard metal attached to a core plate, comprising forming two congruent recesses in the core plate, said recesses being symmetrically disposed relative to a central plane through said core member, filling the recesses with hard metal powder, covering each of said recesses completely, and said core member at least partly, with a sheet of a metal capable of being plated both on the hard metal powder and on said core plate, plating said sheets on said hard metal powder and said core plate at a temperature below the sintering temperature of said hard metal powder, subjecting the assembly to a plastical shaping operation, heating the assembly thus shaped to said sintering temperature and maintaining the same at this temperature until said powder has become sintered into hard metal, and forming at least one saw blade from the blank thus produced.

9. A method of manufacturing saw blades having cutting edges of hard metal attached to a core plate, comprising filling a space between two core plates for said saw blades with hard metal powder, covering said space completely, and said core plates at least partly, with sheets of a metal platable both on the hard metal powder and on said core plates, plating said sheets on said hard metal powder and said core plates at a temperature below the sintering temperature of said hard metal powder, subjecting the assembly to a plastical shaping operation, heating the assembly thus shaped to said sintering temperature and maintaining the same at this temperature until said powder has become sintered into hard metal, and forming at least two saw blades from the blank thus produced.

10. A method according to claim 9 comprising wrapping up said core plates together with the plating metal thereon, in an envelope of greater strength than said plating metal in order to keep said parts together during the subsequent plastical shaping operation.

11. A method of manufacturing saw blades having cutting edges of hard metal attached to a core plate, comprising forming at least one recess in the core plate, filling said recess in the core plate with hard metal powder, covering said recess wholly and said core plate at least partly with a metal platable on both said plate and the hard metal powder, plating said metal on said hard metal powder and said core plate at a temperature below the sintering temperature for said powder, heating said assembly to said sintering temperature and maintaining this temperature until said powder has become sintered into hard metal, removing said plating metal from said assembly and forming at least one saw blade from the blank thus produced.

12. A method of manufacturing saw blades having cutting edges of hard metal attached to a core plate, comprising forming at least one recess in said core plate, filling said recess in the core plate with hard metal powder, covering said recess wholly and said core plate at least partly with a metal platable on both said core plate and the hard metal powder, said plating metal being of such a nature that, during a subsequently undertaken sintering of said hard metal powder and hardening of the core member, it will protect the material against decarburization and/or oxidation, plating said metal on said hard metal powder and said core plate at a temperature below the sintering temperature for said powder, heating said assembly to said sintering temperature and maintaining this temperature until said powder has become sintered into hard metal, and forming at least one saw blade from the blank thus produced.

13. A method of manufacturing saw blades having cutting edges of hard metal attached to a core member, comprising inserting a core member for said saw blade having at least one recess therein in a tube of a metal which is platable on both said core member and said hard metal, filling said recess with hard metal powder, plating said tube on said core member at a temperature below the sintering temperature for said powder, subjecting the assembly to a plastical shaping operation, heating the assembly thus shaped to said sintering temperature and maintaining the same at this temperature until said powder has become sintered into hard metal, and forming at least one saw blade from the blank thus produced.

14. A method of manufacturing a cutting tool having a cutting edge of hard metal attached to a core plate, comprising arranging hard metal powder against a body made from a metal capable of being plated on said hard metal powder and on the core plate for said cutting tool by application of heat and pressure, subjecting said body and said powder to a plastical shaping operation to impart to it a thickness suitable for the completed cutting tool, heating the assembly obtained to the sintering temperature for said hard metal powder and maintaining the assembly at said temperature until said powder has been sintered into hard metal, and forming at least one cutting tool from the blank thus produced.

15. A method of manufacturing cutting tools, especially saw blades, having cutting edges of hard metal, in which hard metal powder at least partly is enclosed between relatively thin walls of a softer metal, comprising filling at least one recess adjacent a core plate for said tool with hard metal powder, covering said recesses completely, and said core plate at least partly, with a foil of a metal capable of being plated both on hard metal produced from such powder and on said core plate the plating temperature of said foil being lower than the sintering temperature of said hard metal powder, plating said foil onto said core plate at a temperature below said sintering temperature of the hard metal powder, subjecting the assembly thus obtained to a plastical shaping operation to impart thereto a materiel thickness suitable for the completed tool, heating the assembly thus shaped to the sintering temperature of said hard metal powder, and maintaining said assembly at said temperature until said powder has become sintered into hard metal and said foil has become plated thereto, and stamping or cutting out at least one cutting tool from the blank thus produced.

16. In a method of manufacturing a cutting tool having cutting edges of hard metal wherein said cutting tool is secured to a core plate, comprising the steps of disposing hard metal powder in contact with a foil made of plating material, covering at least a portion of said core plate with said foil, subjecting at least said hard metal powder to a plastical shaping operation, heating the assembly of the hard metal powder, foil and core plate to the sintering temperature of said hard metal powder and maintaining said assembly at said temperature until said powder has become sintered into hard metal, and forming at least one saw blade from the blank thus produced.

References Cited in the file of this patent

UNITED STATES PATENTS

| Number | Name | Date |
| --- | --- | --- |
| 907,167 | Neill | Dec. 22, 1908 |
| 1,803,875 | Stoody et al. | May 5, 1931 |
| 1,860,275 | Chapin | May 24, 1932 |
| 1,904,049 | Hoyt | Apr. 18, 1933 |
| 1,948,489 | Balke | Feb. 27, 1934 |
| 1,950,355 | De Bats | Mar. 6, 1934 |
| 1,951,174 | Simons | Mar. 13, 1934 |
| 1,951,856 | Balke | Mar. 20, 1934 |
| 2,238,351 | Van Der Pyl | Apr. 15, 1941 |
| 2,365,965 | Littman | Dec. 26, 1944 |

FOREIGN PATENTS

| Number | Country | Date |
| --- | --- | --- |
| 400,565 | Great Britain | Oct. 26, 1933 |
| 801,856 | France | May 30, 1936 |